(No Model.)
G. A. KOLLENBERG.
HAND TRUCK.
No. 321,902. Patented July 7, 1885.
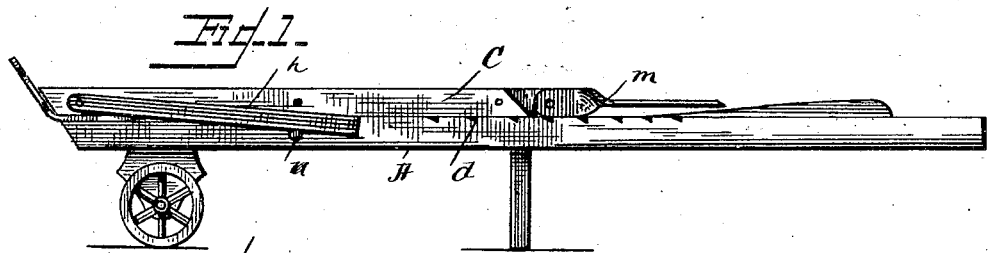
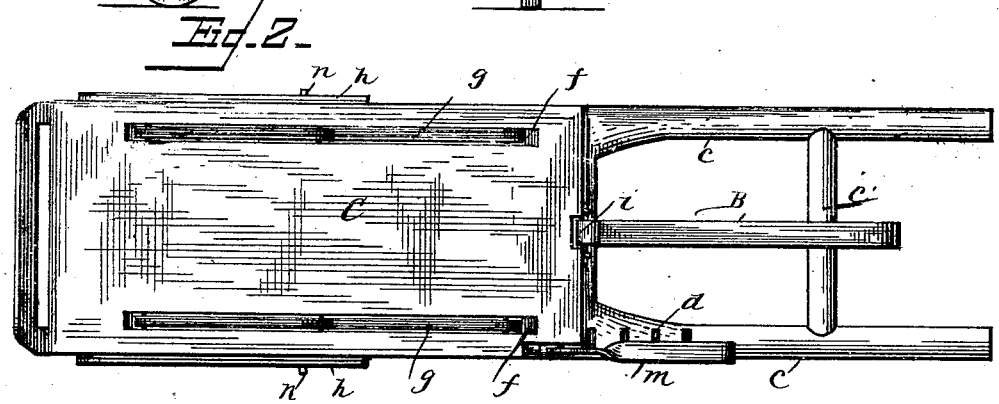
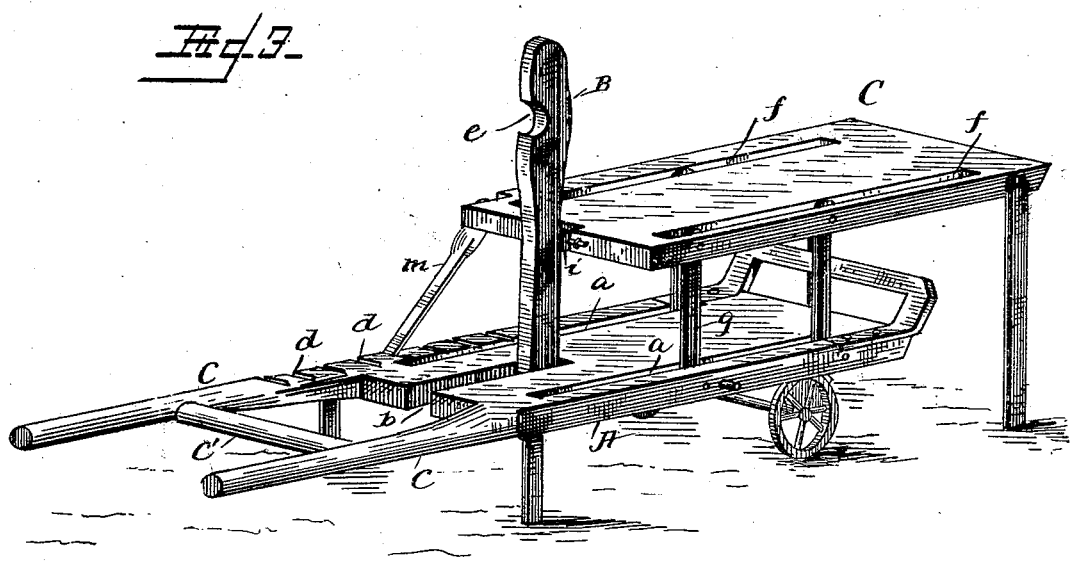
WITNESSES
F. L. Ourand
John T. Suter
INVENTOR
George A. Kollenberg
By Frank A. Fouts &
J. D. Atchison
Attorney

UNITED STATES PATENT OFFICE.

GEORGE A. KOLLENBERG, OF OWENSBOROUGH, KENTUCKY.

HAND-TRUCK.

SPECIFICATION forming part of Letters Patent No. 321,902, dated July 7, 1885.

Application filed April 21, 1885. (No model.)

*To all whom it may concern:*

Be it known that I, GEORGE A. KOLLENBERG, a citizen of the United States, residing at the city of Owensborough, in the county of Daviess and State of Kentucky, have invented certain new and useful Improvements in Hand-Trucks, of which the following is a specification, reference being had therein to the accompanying drawings.

This invention relates to the construction of trucks for use in receiving and transporting articles of merchandise; and it consists, substantially, in the same as constructed, and in the particular combination of parts to be hereinafter distinctly described, and pointed out in the claims.

The object of my invention is to supply a truck by which articles—such as barrels, boxes, and the like—may be received from an elevated position or height and lowered without the necessity of the operator having to lift them down through bodily exertion.

Referring to the annexed sheet of drawings, Figure 1 represents a side view of a truck in which my improvements are embodied. Fig. 2 represents a top or plan view, and Fig. 3 is a perspective view thereof.

Reference being had to the several parts by the letters marked thereon, A represents a truck of ordinary construction, except that at corresponding sides it is provided with channels or recesses $a\ a$, and in the floor or base thereof with a mortise or slot, $b$, extending inwardly from the front edge. The side pieces of the truck terminate with handles $c$, as shown, and are connected by a brace, $c'$, and the top of one or both is formed with indentations or serrations $d$. Pivoted on a pin extending between the two sides of the slot $b$ is a lever, B, having a recess, $e$, in its longer arm, by which it rests normally in place on the brace $c'$.

C represents a supplemental floor, that is formed at opposite sides with channels $f\ f$, like unto those $a\ a$ of the main floor, and is adjustably connected to said main floor by rods or supports $g$, which are pivoted upon pins held between the sides of the channels in both the said main and supplemental floors, as shown. The supplemental floor is provided at its forward end with braces $h\ h$, the same being of about length sufficient to rest vertically upon the ground when the said floor is elevated to its greatest height. At the forward end of the floor C, corresponding in location to the slot $b$ of the main floor, is a friction-roller, $i$, while at the same end, to one side, is pivoted a pawl or detent, $m$, whose free end works in the serrations $d$ in the top of the side piece of the truck, by which the supplemental floor is maintained elevated against the weight or strain imposed upon it. Extending from the side pieces of the truck are pins $n$, upon which the braces $h$ rest when the supplemental floor is not elevated.

It is evident that should it not be desired to elevate the floor C, the structure could be employed to perform the services of the ordinary truck.

The operation of my device is as follows: Should it be desired to receive a barrel or box from a wagon or other elevated position, the truck is moved up to it, and then by lifting the end of the lever B the floor C will be elevated, the pawl $m$ acting to detain it at the position brought. After the load has been delivered upon the floor C the latter may be lowered with its load to rest upon the main floor, and the goods transported to the place desired. Similarly can the loading of a wagon be effected.

Having thus described my invention, what I claim as new, and desire to secure by Letters Patent, is—

1. In a truck, the combination of the main body having side pieces in which are formed serrations or indentations, and the main floor having slots $a\ a$ and $b$, the lever pivoted in slot $b$, having groove $e$, the supplemental floor having channels $f$ and friction-roller $i$, the braces $h$, the elevating-rods $g$, and the pawl $m$, all operating substantially as shown and described.

2. In a merchant-truck, the combination, with the main floor having side parallel slots in which are pivoted elevating-arms, of the adjustable floor, also provided with side parallel slots, said adjustable floor having dependent forward arms, the sides of the main platform being provided with pins to support the arms $h$ when the upper platform is lowered, substantially as shown, and for the purposes specified.

In testimony whereof I affix my signature in presence of two witnesses.

GEORGE A. KOLLENBERG.

Witnesses:
GRAHAM HUGHES,
MARTIN YUNCE.